Inventor:
Frank Owen
By Baldwin Wight Diller & Brown
Attorneys 3,555,644
CUTTING TOOLS
Frank Owen, Huddersfield, England, assignor to Murex Limited, Rainham, Essex, England
Filed Apr. 22, 1968, Ser. No. 722,875
Claims priority, application Great Britain, May 1, 1967, 20,009/67
Int. Cl. B26d 1/12
U.S. Cl. 29—105
12 Claims

ABSTRACT OF THE DISCLOSURE

The invention provides a cutting tool head in which removable cutting inserts (particularly blades) can be positioned with sufficient accuracy to provide fine quality surface finishes without the need for special grinding operations. The new cutting tool head comprises a body which is slotted to receive the removable cutting insert, and the cutting tool head comprises a first member and a second member, the first member being seated in the slot and being screw threaded, the second member being complementarily screw threaded and mating with the first member and having a bearing surface to abut a lateral edge of the cutting insert, whereby relative screw motion of the first member and the second member adjusts the projection of the cutting insert from the body.

---

Figure 1:
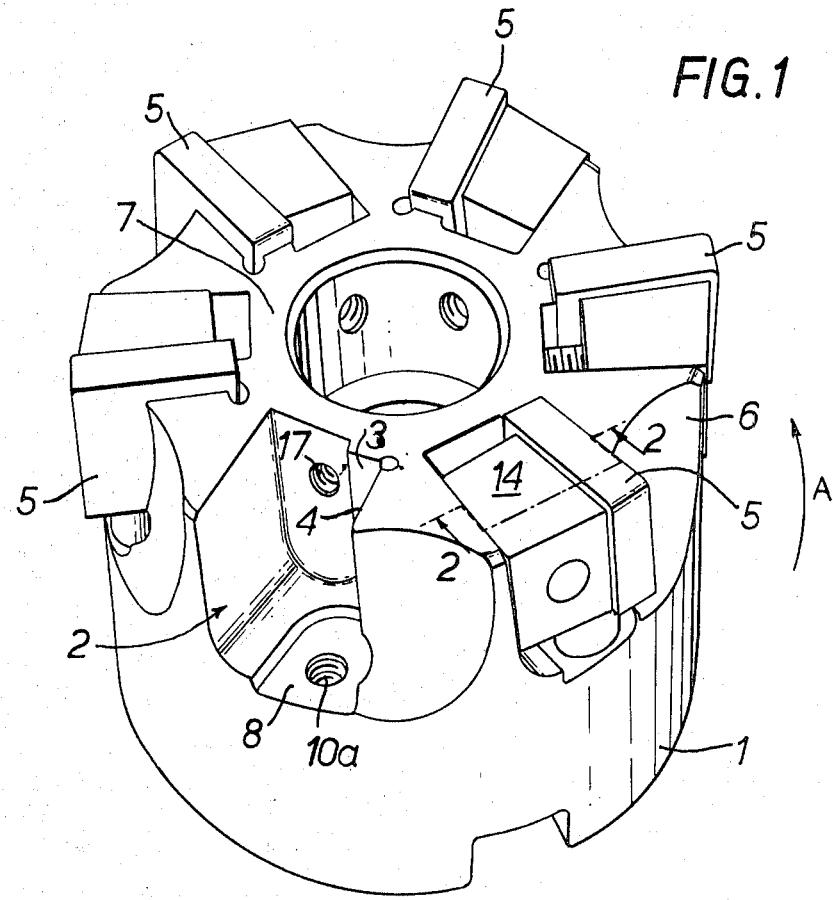

This invention relates to cutting tools such as milling cutters and in particular to means for locating and adjusting the position of the blades thereof.

Milling cutters comprising a rotatable body, around the periphery of which seatings are provided for interchangeable or indexible cutting inserts or blades are well known. The body is usually solid and the seatings basically comprise slots cut therein which are provided with one or more carefully machined surfaces, which the faces and/or edges of the blades are arranged to abut in order to locate them as desired. In addition or instead of providing accurately machined seating surfaces in the cutter body, seatings are sometimes provided by separate members secured thereto.

In order to reduce the amount of accurate machining required, it is known to arrange for at least one edge or end of a blade to be located by a pin secured in its associated slot so that only the pin needs to be accurately ground to provide a seating for a relevant end or edge of the blade. In development of such an arrangement it has further been proposed that in place of such fixed pins a locating member should be provided in the form of a cylindrical body removably secured in each blade receiving slot so that the blade rests on one face thereof. Apart of course from it being possible readily to replace a locating member if necessary, by making the cylindrical body of a suitably large diameter so that only a part of the seating surface it provides is in contact with its associated blade at any time, it could then be arranged to rotate the body when a part of it in contact with a blade became worn, to present a new unworn seating surface. Further the arrangement possessed the advantage that it made it possible, if locating members of suitably different lengths were provided, by appropriately selecting them, to assemble a milling cutter in which the blades were positioned to extend from the cutter body within very close tolerances, without having to grind the seating surfaces in the cutter body on which the locating members were arranged to rest, to a corresponding tolerance.

While these arrangements have ensured a reasonable and generally acceptable standard of surface finish on machined components, it has remained only possible to obtain fine surface finishes, usually expressed in terms of microinches, by employing special grinding operations to position the blades within the accuracy required. The problem is aggravated by the fact that to obtain the finest finishes it is necessary to set one blade in relation to the others, or two or more blades in relation to each other, to induce a scraping or smoothing action.

It is the object of this invention to provide means which whilst retaining the advantages of the hitherto known locating members referred to above, enable the blades of a cutting tool to be positioned with the accuracy and in the manner required to provide fine quality surface finishes without the need for special grinding operations.

According to this invention in a cutting tool comprising a rotatable body provided with slots to receive interchangeable or indexible cutting inserts or blades, means are provided to adjust the extent to which the blades project from the body, the said means comprising for each blade a first member adapted to be removably seated in the slot in which the blade is received, the first member being screw threaded to receive a complementarily screw threaded second member, the second member being provided with a surface to abut a lateral edge of the blade.

Preferably the first member is of cylindrical form and is externally screw threaded to receive a second member in the form of an internally screw threaded sleeve. The first member is conveniently bored and counterbored to receive a cap headed screw by which it is secured in the blade receiving slot.

With this arrangement it will be seen that the second member being, within the limits of its engagement with the first member, infinitely adjustable in relation thereto, a blade seated on the second member, may be adjustably positioned within any degree of accuracy required.

As in the case of the previously known locating members in the form of cylindrical bodies, the second member or at least the seating surface with which it is provided, is made of larger cross section than the thickness of the blade with which it is associated, and is further positioned eccentrically with respect to the edge of the blade contacted thereby. In this way different parts of the seating surface of the second member may be brought into contact with the blade by rotating the first member. A locking ring is preferably mounted on the first member, to fix the second member in any given position thereon.

Conveniently in the preferred arrangement the second member or sleeve is adapted to be turned by a C-spanner, as is also the locking ring when provided.

Figure 2:
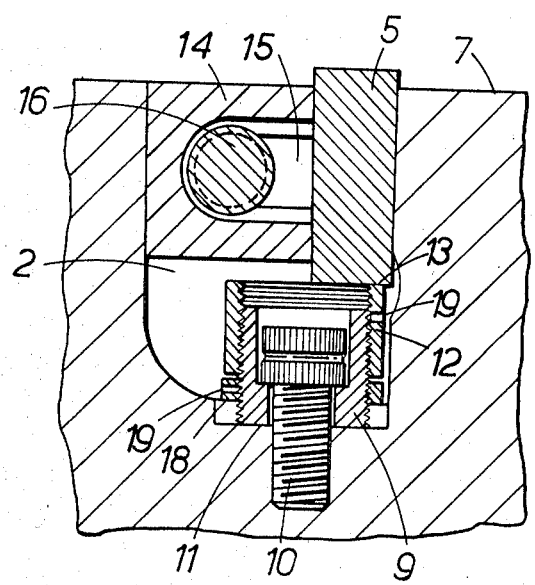

A milling cutter provided with blade locating means in accordance with this invention is illustrated in the accompanying drawing in which:

FIG. 1 is a perspective view of the milling cutter, and
FIG. 2 is a section on the line 2—2 of FIG. 1.

Referring to the drawing, a milling cutter comprises a body 1 around the periphery of which blade receiving slots generally indicated at 2 are provided. Two carefully machined surfaces 3 and 4 are provided in each slot to provide seatings for an edge and the leading face of an indexible and interchangeable blade 5, the body of the cutter when in use being rotated in the direction of the arrow A. Chip pockets are provided in the body in front of each blade as indicated at 6.

The base of each slot i.e. its end remote from the front face 7 of the cutter, is formed with a flat 8 to provide a seating for the means in accordance with this invention for adjusting the extent to which the blades project from the front face of the cutter.

As can best be seen from FIG. 2 these means comprise a first member in the form of an externally screw threaded cylindrical body 9, bored and counterbored to receive a cap headed screw 10, by means of which the body 9 is secured in its associated slot 2 with its lower surface 11 seated on the flat 8, a threaded bore 10a being provided in the base of the slot 2 to receive the screw 10. A second member in the form of an internally screw threaded sleeve 12 is mounted on the body 9, the upper end of the sleeve 12 being formed to provide an annular seating surface 13 for the blade with which it is associated. As can be seen the diameter of the annular seating surface 13 is greater than the thickness of the blade and is disposed eccentrically with respect to the blade so that at any one time only a part of the surface 13 is in contact with the lower edge or end of the blade.

As a result of this arrangement, it is possible, as indicated above, to rotate the body 9 with the sleeve 12 fixed in relation thereto, to present different portions of the surface 13 to abut the relevant edge of the blade, in the event of wear occurring to a previously contacted portion of the surface.

Each blade is arranged to be locked in position by a wedge 14 in which a recess 15 is formed to receive a screw 16 by means of which it is secured in position, the screw 16 being secured in a screw threaded bore 17 provided in the inner wall of each slot 2.

To ensure that the sleeve 12 may be securely locked against movement relative to the body 9, as shown in FIG. 2 a locking ring 18 is preferably provided on the bdoy 9, beneath the sleeve 12 to be moved into abutment therewith in order to lock the same after it has been set.

The manner in which it is arranged to rotate the sleeve 12 or the locking ring 18 is largely a matter of choice but conveniently a series of radially extending holes 19 are provided around their periphery to adapt them for turning by a C-spanner.

It will be appreciated that for any given pitch of the co-operating screw threads of the sleeve 12 and body 9, which may of course be varied to suit requirements, the angular adjustments of the sleeve 12 in relation to the body 9 to raise or lower the extent to which a blade projects from the end face 7 of the cutter body by a given amount can readily be determined.

It will readily be seen that the blade adjusting means according to the invention can be used either to adjust all the blades in one cutter accurately to the same height or, alternatively as is their prime purpose to adjust one or more specially designed finishing blades so that they project a predetermined amount, usually between .0005" and .002" beyond the remainder to produce a smooth surface on the machined face.

What is claimed is:

1. A cutting tool head comprising a body having a slot therein which is adapted to receive a removable cutting insert and which slot has a seating surface opposing the intended position of a cutting insert within said slot, means for adjusting the projection of a cutting insert from said body including a first member and a second member, said first member being seated against said seating surface and being screw-threaded, said second member being complementarily screw-threaded with respect to said first member and mating therewith and having a bearing surface adapted to abut a lateral edge of the cutting insert when said insert is in position, the said first and second members having associated therewith locking means adapted to selectively lock said second member in position with respect to said first member, rotary screw motion of said second member with respect to said first member serving to adjust the position of said second member along the axis of the rotary screw motion, thereby adjusting the projection of said cutting insert from said body.

2. A cutting tool head as defined in claim 1 wherein said first member is adapted to selectively rotate about said axis of rotary screw motion without undergoing axial movement, with the second member locked in fixed relationship to said first member.

3. A cutting tool head as defined in claim 2 wherein said second member is cylindrical and is adapted to abut said cutting insert with its end.

4. A cutting tool head as defined in claim 3 wherein the radius of said end of said second member is greater than the width of the lateral edge of said cutting insert, the axis of said second member being offset from the centre plan of the cutting insert parallel to said axis.

5. A cutting tool head comprising a body having a slot therein adapted to receive a cutting insert and having a flat seating surface, a removable cutting insert, an externally screw-threaded cylindrical first member having a flat end thereof held in engagement with said seating surface by holding means, an internally screw-threaded cylindrical second member engaging with said first member and capable of screw-motion relative thereto, said second member having an end remote from said seating surface defining a bearing surface adapted to abut an edge of said cutting insert when said insert is in position, and an annular internally screw-threaded locking ring, adapted to selectively lock said second member, engaging with said externally screw-threaded first member.

6. A cutting tool head as defined in claim 5 wherein the first member is bored and counter-bored to receive a cap-headed screw, said holding means comprising a screw-threaded bore in said seating surface and a cap-headed screw located in said first member and engaging with said screw-threaded bore.

7. A cutting tool head as defined in claim 6 wherein said locking ring and said second member are provided with peripheral holes adapted to be engaged by a C-spanner.

8. A cutting tool head as defined in claim 6 in which the axis of the second member is offset with respect to the centre of said edge of said insert, the diameter of said second member being greater than the width of said edge of said insert.

9. The combination of claim 1 wherein wedge means are provided to hold said cutting insert within said slot.

10. The combination of claim 2 wherein the axis of said second member is offset with respect to the centre of said edge of said cutting insert, whereby the first and second members may be rotated as one unit to provide fresh surfaces abutting said edge without disturbing the axial position of said second member.

11. A milling cutter comprising a generally disk-shaped body having a front face and a plurality of slots spaced about said front face, each of said slots being adapted to receive a removable cutting insert and each slot having associated therewith a seating surface opposing the intended position of a cutting insert within said slot, means within each slot for adjusting the projection of each respective cutting insert from said body including a first and second member, said first member being seated against said seating surface and being screw-threaded, said second member being complementarily screw-threaded with respect to said first member and mating therewith and having a bearing surface adapted to abut a lateral edge of the cutting insert when said insert is in position, the said first and second members having associated therewith locking means adapted to selectively lock said second member in position with respect to said first member, rotary screw motion of said second member with respect to said first member serving to adjust the position of said second member along the axis of the rotary screw motion, thereby adjusting the projection of said cutting insert from said body.

12. A milling cutter as defined in claim 11 wherein wedge means are provided for each cutting insert to hold said insert in position when said projection has been adjusted.

References Cited
UNITED STATES PATENTS

| | | | |
|---|---|---|---|
| 2,690,610 | 10/1954 | Begle | 29—105 |
| 2,930,111 | 3/1960 | St. Clair | 29—105 |
| 3,273,222 | 9/1966 | Begle | 29—105 |
| 3,339,257 | 9/1967 | Hargreaves | 29—105 |

HARRISON L. HINSON, Primary Examiner